(12) United States Patent
Holgersson et al.

(10) Patent No.: US 12,550,880 B2
(45) Date of Patent: Feb. 17, 2026

(54) INSECT NET LAMELLA AND METHOD OF PRODUCING THE SAME

(71) Applicant: AB LUDVIG SVENSSON, Kinna (SE)

(72) Inventors: Louise Holgersson, Öjersjö (SE); Sara Widén, Borås (SE); Niclas Bergh Gustafsson, Skene (SE); Stefan Almström, Kinnarumma (SE)

(73) Assignee: AB LUDVIG SVENSSON, Kinna (SE)

( * ) Notice: Subject to any disclaimer, the term of this patent is extended or adjusted under 35 U.S.C. 154(b) by 81 days.

(21) Appl. No.: 18/562,046

(22) PCT Filed: May 19, 2022

(86) PCT No.: PCT/EP2022/063621
§ 371 (c)(1),
(2) Date: Nov. 17, 2023

(87) PCT Pub. No.: WO2022/243460
PCT Pub. Date: Nov. 24, 2022

(65) Prior Publication Data
US 2024/0260561 A1    Aug. 8, 2024

(30) Foreign Application Priority Data

May 21, 2021   (SE) .................................. 2150652-2
Sep. 28, 2021  (SE) .................................. 2151184-5

(51) Int. Cl.
*B29C 65/00*     (2006.01)
*A01M 3/00*      (2006.01)
(Continued)

(52) U.S. Cl.
CPC ......... *A01M 3/002* (2013.01); *B29C 65/7443* (2013.01); *B29C 66/729* (2013.01); *D06H 7/223* (2013.01)

(58) Field of Classification Search
CPC ......... A01M 3/002; A01G 13/10; B26D 7/10; B29C 65/08; B29C 65/083; B29C 65/7435; B29C 65/7443
(Continued)

(56) References Cited

U.S. PATENT DOCUMENTS 2,628,412 A    2/1953  Vera
4,534,819 A    8/1985  Payet
(Continued)

FOREIGN PATENT DOCUMENTS

DE        4421465      12/1995
DE     102009007748    8/2010
(Continued)

OTHER PUBLICATIONS

International Search Report and Written Opinion were mailed on Oct. 4, 2022 by the International Searching Authority for International Application No. PCT/EP2022/063621 filed on May 19, 2022 and published as WO2022243460 (Applicant—Ab Ludvig Svensson) (8 pages).

*Primary Examiner* — James D Sells
(74) *Attorney, Agent, or Firm* — Ballard Spahr LLP

(57) ABSTRACT

Described is an insect net strip produced from a wide insect net which has been cut in a warp direction (xnet) by means of a one-step ultrasonic cutting and welding process. The insect net strip includes warp yarns and weft yarns extending substantially perpendicular to each other and at least 90% of the warp and weft yarns are monofilament yarns made of a thermoplastic material. After cutting and welding process the insect net strip has a first and a second edge extending parallel to said warp yarns each including a deformation zone being constituted by consolidated thermoplastic material deriving at least from said weft yarns. The deformation zone has a width (wdz) in the transverse direction (ystrip) of between 0.5-35 times the weft yarn diameter (øwe). At least (Continued)

90% of gaps between adjacent weft yarns in the deformation zone are closed by consolidated thermoplastic material at least from the weft yarns which has been melted together to form a continuous or substantially continuous reinforced band-shaped edge portion of said insect net strip. The insect net strip is suitable for use in accordion-style constructions in greenhouse ventilation openings. A method for producing the insect strips is also described.

19 Claims, 18 Drawing Sheets

(51) Int. Cl.
*B29C 65/74* (2006.01)
*D06H 7/22* (2006.01)

(58) Field of Classification Search
USPC ....................................................... 156/73.3
See application file for complete search history.

(56) References Cited

U.S. PATENT DOCUMENTS

| | | | | |
|---|---|---|---|---|
| 4,778,546 A | * | 10/1988 | Kitani | B41N 1/247 |
| | | | | 156/580.2 |
| 2014/0057513 A1 | | 2/2014 | Brauer | |
| 2014/0186579 A1 | | 7/2014 | Botelho et al. | |

FOREIGN PATENT DOCUMENTS

| | | |
|---|---|---|
| EP | 0267604 | 5/1988 |
| FR | 2737227 | 1/1997 |
| JP | 11152680 | 6/1999 |
| JP | 3101644 U | 6/2004 |
| JP | 2005281877 | 10/2005 |
| JP | 3150887 | 6/2009 |
| JP | 2012095617 | 5/2012 |
| JP | 2017071966 | 4/2017 |
| NL | 1007720 | 6/1999 |
| NL | 2014587 | 10/2016 |
| NL | 2015156 | 2/2017 |
| WO | WO 2021/171203 | 9/2021 |

* cited by examiner

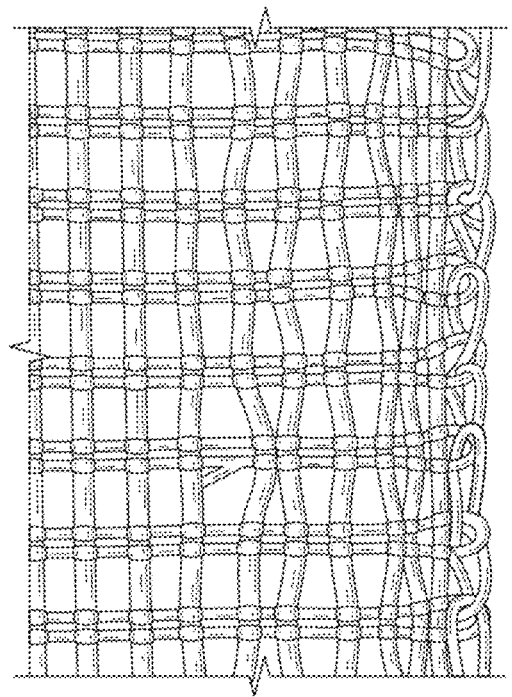
*Fig. 13a*
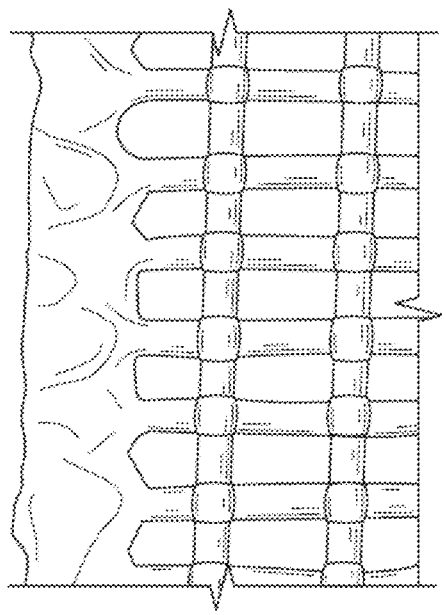 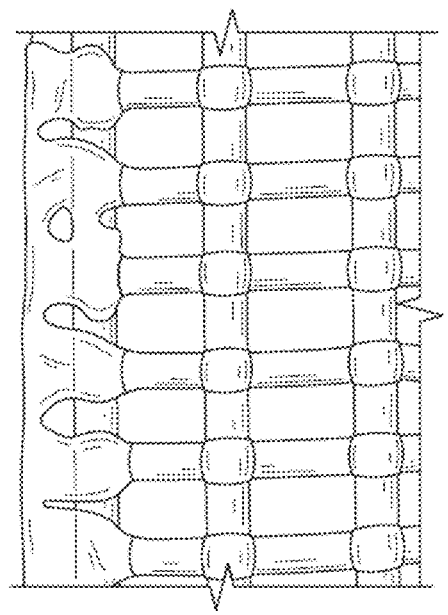
*Fig. 13b*   *Fig. 13c*

INSECT NET LAMELLA AND METHOD OF PRODUCING THE SAME

CROSS-REFERENCE TO RELATED APPLICATIONS

This application is a U.S. National Phase Application of International Application No. PCT/EP2022/063621, filed May 19, 2022, which claims priority to Swedish Application No. 2150652-2, filed May 21, 2021, and Swedish Application No. 2151184-5, filed Sep. 28, 2021, each of which are hereby incorporated by reference in their entirety.

TECHNICAL FIELD

The present disclosure concerns net insect strips obtained by cutting a wide insect net by means of a one-step ultrasonic cutting and welding process, and the method of producing said insect net strips.

BACKGROUND OF THE INVENTION

In greenhouses it is sometimes necessary to use insect nets in ventilation openings to prevent unwanted insects to enter the greenhouse and in some instances to keep wanted insects from leaving the greenhouse. When installing insect nets in an existing greenhouse, problems with elevated temperatures or humidity or low carbon dioxide levels may arise since insect nets will always to some extent impair the ventilated air flow. This must be considered when designing greenhouses.

Roofs of conventional glass greenhouses are provided with ventilation windows that can be opened and closed. When installing insect nets in such windows, the net installation must be flexible to fill the opening of the window when it is opened, but also be able to fold out of the way of the closing window. One conventional way of doing this is to confection an accordion-type of net construction as seen in FIG. 1.

To be able to produce such a construction it is conventional to first produce insect net lamellas, which thereafter are confectioned together into the accordion shape. The lamellas are easily produced using conventional band weaving technique resulting in lamellas with closed longitudinal edges, which can be confectioned with sewing machines.

However, there is also a substantial disadvantage of this way of making insect nets, since band weaving produces double weft inserts, and double yarns next to each other decrease the air flow through the net. Without double weft inserts, the airflow increases typically 30-50%.

To avoid this problem, a conventional full width weaving loom can be used, producing a net typically 2-4 m wide. This insect net can be chosen to have any weaving pattern, thereby optimizing ventilation and insect exclusion. The net is later cut into lamellas using a one-step ultrasonic cutting and welding process, leaving a closed edge on the net lamella, suitable to confection with a sewing machine.

SUMMARY OF THE INVENTION

The above objects may be achieved with an insect net strip, obtained by using the one-step ultrasonic cutting and welding method as described herein. The insect net strips are used in accordion-style insect net constructions. Further embodiments are set out in the description and in the drawings.

As set out herein there is provided a one-step ultrasonic cutting and welding method of manufacturing an insect net strip suitable for confectioning by a sewing machine. The method comprises the steps of a) providing a woven insect net comprising
warp yarns extending in a warp yarn direction ($x_{net}$) of the insect net, and weft yarns having a weft yarn diameter ($\varnothing_{we}$), and extending in a weft yarn direction ($y_{net}$) perpendicular or substantially perpendicular to the warp yarn direction ($x_{net}$) of the woven insect net; and wherein
at least 90% of the warp and weft yarns are monofilament yarns made of a thermoplastic material; and b) feeding the woven insect net into an ultrasonic cutting device comprising an ultrasonic surface and at least two ultrasonic cutting and welding tools; and c) feeding the woven insect net through the ultrasonic cutting device to obtain an insect net strip having
a width ($w_{strip}$) in a transverse direction ($y_{strip}$), which is smaller than a width ($w_{net}$) of the woven insect net; and
a first and a second edge extending in a longitudinal direction ($x_{strip}$) of the insect net strip and parallel to warp yarns of the insect net strip, the first and second edges each comprising a deformation zone being constituted by consolidated thermoplastic material deriving at least from weft yarns of the insect net strip, said deformation zone having a length along the edge and a width ($w_{dz}$) in the transverse direction ($y_{strip}$) of the insect net strip, the width ($w_{dz}$) of the deformation zone being in the range of between 0.5 times the weft yarn diameter ($\varnothing_{we}$) and 35 times the weft yarn diameter ($\varnothing_{we}$); and wherein
at least 90% of gaps between adjacent weft yarns in the deformation zone are closed by at least the weft yarns being melted together, thereby forming a consolidated reinforced edge portion of the insect net strip.

As set out herein there is also provided an insect net strip produced by cutting the insect net described below along its warp direction ($x_{net}$) using the one-step ultrasonic cutting-and-welding method disclosed herein. The insect net strip comprises:

warp yarns having a diameter and extending in a longitudinal direction ($x_{strip}$) of the insect net strip, and weft yarns having a weft yarn diameter ($\varnothing_{we}$) and extending in a transverse direction ($y_{strip}$) perpendicular, or substantially perpendicular to the longitudinal direction ($x_{strip}$) of the insect net strip.

At least 90% of the warp and weft yarns of the insect net strip are monofilament yarns made of a thermoplastic material, and a first and a second edge extending in a longitudinal direction ($x_{strip}$) of the insect net strip and parallel to the warp yarns, the first and second edges each comprising a deformation zone being constituted by consolidated thermoplastic material deriving from at least the weft yarns, said deformation zone having a length along the first and second edge, and a width ($w_{dz}$) in the transverse direction ($y_{strip}$) of the insect net strip, wherein the width ($w_{dz}$) of the deformation zone being in the range of between 0.5 times the weft yarn diameter ($\varnothing_{we}$) and 35 times the weft yarn diameter ($\varnothing_{we}$); and at least 90% of gaps between adjacent weft yarns in the deformation zone being closed by consolidated thermoplastic material deriving from at least the weft yarns which have been melted together to form a continuous or substantially continuous reinforced band-shaped edge portion of the insect net strip.

In a further aspect of the invention there is also provided accordion-type assemblies wherein two or more of the inventive insect net strips as described herein which have been produced according to the method also described herein have been sewn together to form accordion-style insect net constructions for use in ventilation openings.

In yet a further aspect of the invention, there is provided a use of the insect net strip as described herein and produced as described herein, in a confectioned accordion-type assembly wherein two or more insect net strips are sewn together.

BRIEF DESCRIPTION OF THE DRAWINGS

FIG. 13a which is a view of a longitudinally extending edge on a band woven net.

FIGS. 13b and 13c are views of edges 24, 25 of an insect net strip 20 cut by the method described herein.

DETAILED DESCRIPTION

In the following detailed description, reference is made to the accompanying set of drawings that form a part of the description hereof and in which are shown by way of illustration several specific embodiments. It is to be understood that other embodiments are contemplated and may be made without departing from the scope of the present invention. The following detailed description, therefore, is not to be taken in a limiting sense.

Figure 2A:
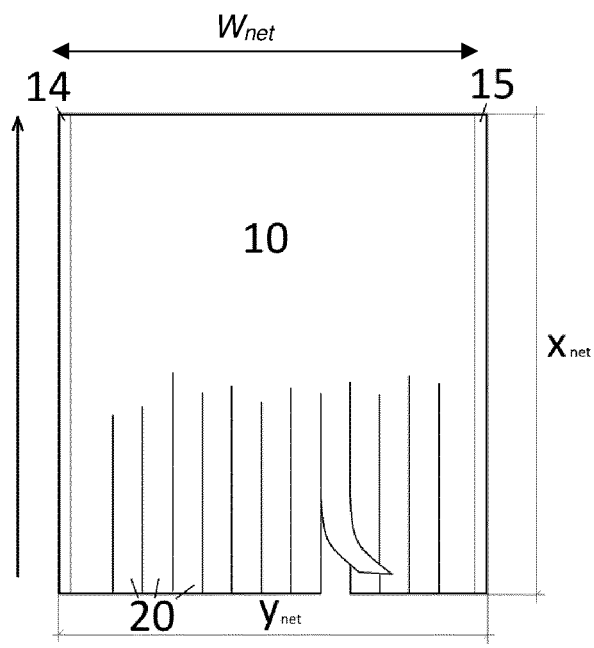
FIG. 2a is a view of an insect net 10 used for making insect net strips 20.
Figure 2B:
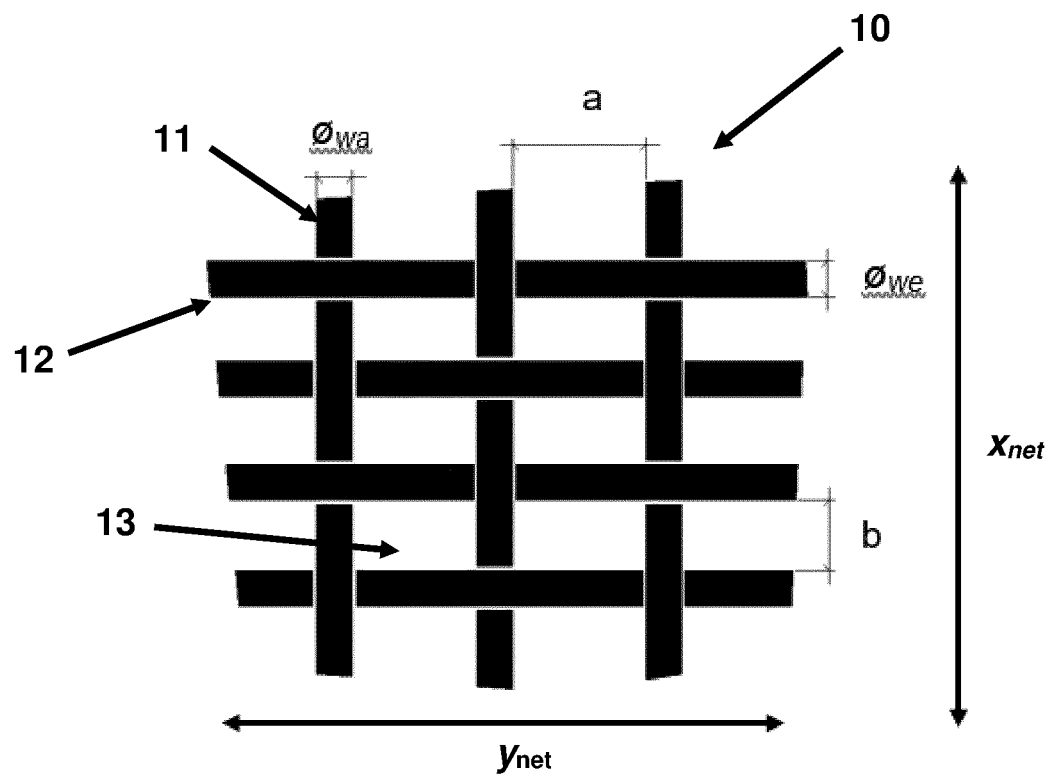
FIG. 2b is a detailed view of the insect net 10 used for making insect net strips 20.

The insect net strip 20 described herein is made from a wide (1-5.5 m) woven insect net cut in the warp direction. FIG. 2a is a view of a woven insect net 10 used for making the insect net strips 20 disclosed herein. As seen in FIG. 2b showing details of the insect net 10, the insect net 10 comprises warp yarns 11 extending in a warp direction ($x_{net}$), i.e., the longitudinal direction of the net, and weft yarns 12 having a weft yarn diameter ($\varnothing_{we}$), and extending in a weft direction ($y_{net}$), i.e., the transverse direction of the net. The weft yarns 12 extend perpendicular, or substantially perpendicular to the warp yarn direction ($x_{net}$) and alternately go over and under the consecutive warp yarns 11. The warp yarns 11 and the weft yarns 12 are spaced apart from each other leaving air gaps or holes 13 in between, wherein the air gaps or holes 13 have a width a in the weft direction ($y_{net}$) and a length b in the warp direction ($x_{net}$) as can be seen in FIG. 2b. The insect net 10 has a first and a second woven selvage edge 14, 15 extending in a longitudinal direction of the insect net, parallel to the warp yarns 11. The total width ($w_{net}$) of the insect net 10 in the transverse direction ($y_{net}$) is advantageously adapted to the width of a conventional loom configured to weave an insect net, i.e., about 1-5.5 m wide.

At least 90% of the warp and weft yarns in the insect net are monofilament yarns, made of a thermoplastic material. The insect net can be manufactured from monofilament yarns of any conventional thermoplastic fiber material but advantageously >80 wt. % of the thermoplastic monofilament yarn is a polyester or co-polyester conventional for fiber production, the wt. % being calculated based on the total weight of the yarn. Preferably the polyester is polyethylene terephthalate (PET), wherein at least 80 wt. % of the polyester originates from ethylene terephthalate monomers. Additives and other polymers make up the rest. The thermoplastic monofilament yarn material typically has a melting point of 240-260° C. and a density of 1.3-1.5 g/cm³.

Since high air permeability is vital to be able to cool and dehumidify the greenhouse, air permeability is a very important factor in the performance of the insect nets when placed in ventilation openings. However, the main purpose for applying an insect net in openings of a greenhouse is to prevent harmful insects from entering the greenhouse, as well as in some instances, preventing useful insects from escaping the greenhouse. This will only be successful if the size of each one of the open areas in the insect net is small enough to prevent insect passage. Thus, when manufacturing an insect net there is an important balance between optimizing the important air permeability, while at the same time preventing insects from passing through the net.

To optimize air flow, i.e., to increase the air flow, the insect net disclosed herein has a weaving pattern wherein at least 40%, preferably at least 60%, more preferably at least 80%, of the weft inserts are single yarn inserts. Weaving with single weft inserts is advantageous since it enables many different weaving patterns that can optimize insect control. Single weft inserts are advantageous compared to double weft inserts which often diminish air permeability, as will be explained below.

Figure 10A:
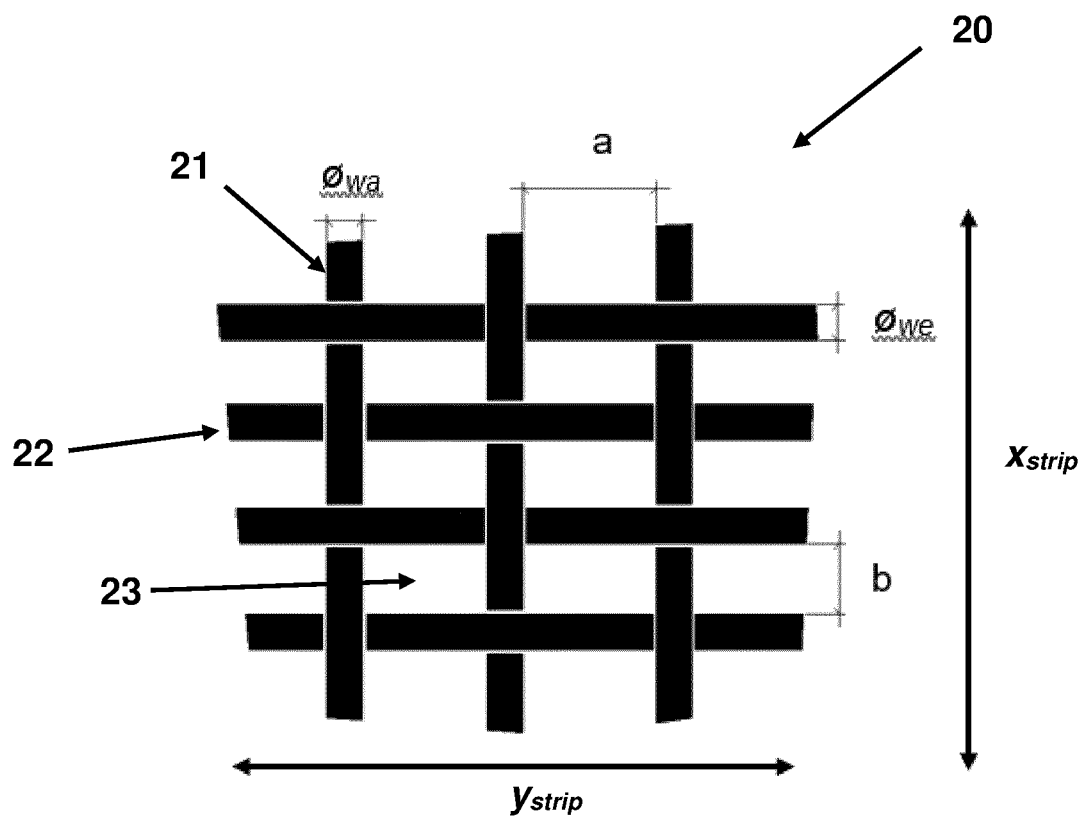
FIG. 10a shows a detailed view of an insect net strip 20 of the invention.

Another factor influencing the air permeability of an insect net is its relative hole area ($A_h$). The larger the hole area the insect net has, the better air permeability becomes. The insect net used for manufacturing insect net strips herein has a relative hole area in a two-dimensional projection ($A_h$) of 15-50%. However, the relative hole area for the insect net is normally 20-48% to avoid passage of some common insects (see below). The relative hole area in a two-dimensional projection is defined by the ratio of the area of holes to the area covered by yarns in a given area of insect net, and is calculated as follows:

$$A_{h=100\%} \times \frac{a \times b}{(a+\varnothing_{we}) \times (b+\varnothing_{wa})} \quad \text{(Formula I)}$$

wherein as seen in FIGS. 2b and 10a
a is the width of the hole in the weft direction
b is the length of the hole in the warp direction
$\varnothing_{we}$ is the diameter of the weft yarn
$\varnothing_{wa}$ is the diameter of the warp yarn
For example, in an insect net wherein
a (i.e. the width of the hole in the weft direction) is 0.70 mm; and
b (i.e. the length of the hole in the warp direction) is 0.40 mm; and
$\varnothing_{we}$ (i.e. the diameter of the weft yarn) is 0.23 mm; and
$\varnothing_{wa}$ (i.e. the diameter of the warp yarn) is 0.23 mm
the relative hole area ($A_h$) is $$A_{h=100\%} \times \frac{0.70 \times 0.40}{(0.70+0.23) \times (0.40+0.23)} = 48\%$$

This means that 48% of the total area of the net is covered with holes, the rest (i.e., 52%) is covered by yarn.

This should be compared to an insect net with double weft inserts wherein the dimension of the hole is the same, i.e., 0.70 mm×0.40 mm, the warp yarn diameter ($\varnothing_{wa}$) is 0.23 mm, and the weft yarn diameter ($\varnothing_{we}$) is 0.20 mm.

Such an insect net has a relative hole area ($A_h$) of $$A_{h=100\%} \times \frac{0.70 \times 0.40}{(0.70+0.20+0.20) \times (0.40+0.23)} = 40\%$$

Figure 3A:
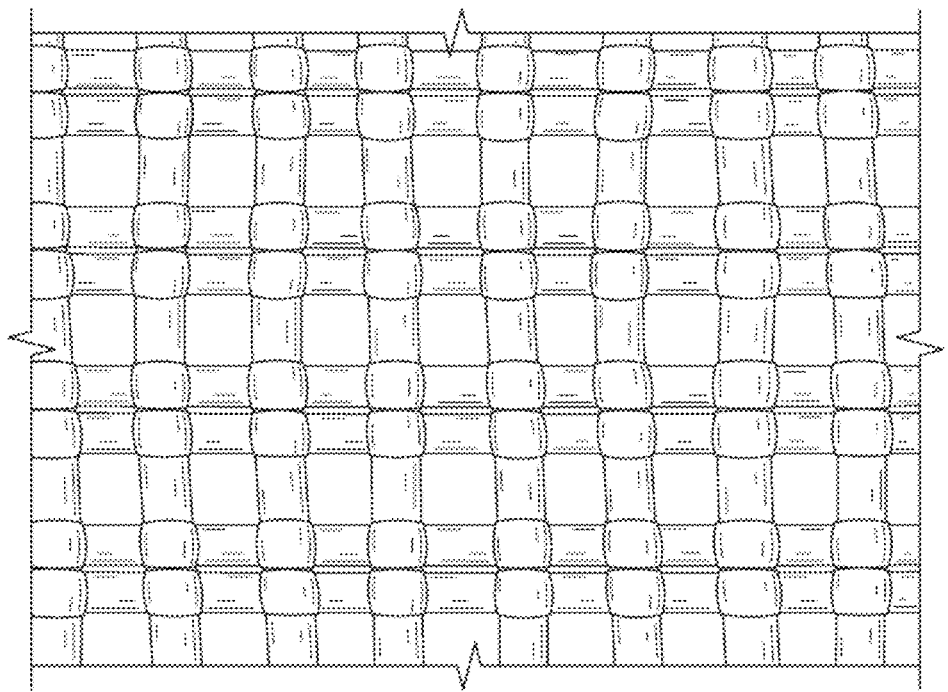
FIG. 3a is a view of an insect net having double weft inserts.
Figure 3B:
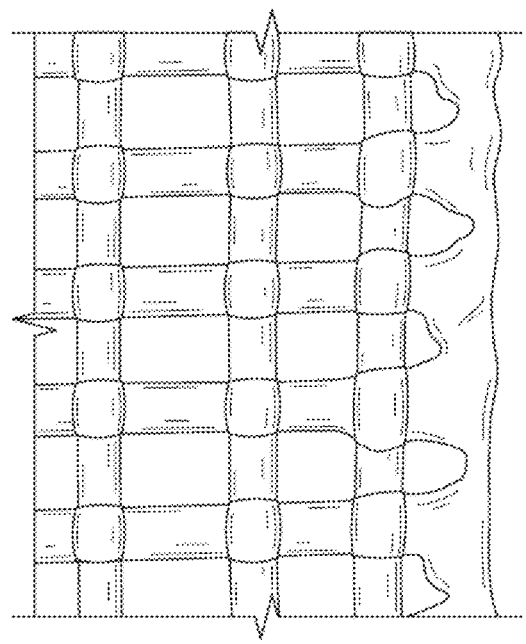
FIG. 3b is a view of an insect net with single weft inserts.

With double weft inserts which is often used in conventional band weaving, the air permeability is less, 40% as compared to 48% with single weft inserts. With wide weaving the weave can be optimized for insect control and high air flow, meaning better possibility to cool and dehumidify the greenhouse, while still preventing passage of unwanted insects. FIGS. 3a and 3b show the difference between single and double weft inserts, wherein in FIG. 3a a band woven insect net with double weft inserts can be compared to an insect net with single weft inserts in FIG. 3b.

The insect net disclosed herein has a hole size of 0.10-0.70 mm in a two-dimensional projection, i.e., in warp and weft directions of the insect net 10. Preferably the hole size in a two-dimensional projection of the insect net 10 is 0.10-0.60 mm, more preferably 0.10-0.50 mm, most preferably 0.15-0.40 mm. This means that the holes of the insect net should have an extension in the warp and/or weft direction of 0.10-0.70 mm, i.e., the extension a in the weft direction is 0.10-0.70 mm and the extension b in the warp direction is between 0.10 to 0.70 mm. The hole size of the insect net limits the possibility for insects to enter/exit the greenhouse and should be adjusted depending on the type of insect the net is intended to stop. Whiteflies (of the family Aleyrodidea) are stopped by holes having a size of about 0.28×0.38 mm, and Thrips require holes having the size 0.15×0.15 mm, or less to prevent passage.

The insect net disclosed herein has a cross-sectional weft yarn area per net length ($A'_{we}/x$) of 20-80 mm²/m in a warp yarn direction. Advantageously, the cross-sectional weft yarn area per net length ($A'_{we}/x$) is 25-70 mm²/m in a warp yarn direction. The cross-sectional weft yarn area per net length indicates the area of material the weft yarns accumulate per unit length in the warp direction and is influenced both by the weft yarn diameter ($\varnothing_{we}$) and weaving picks per cm.

Figure 4:
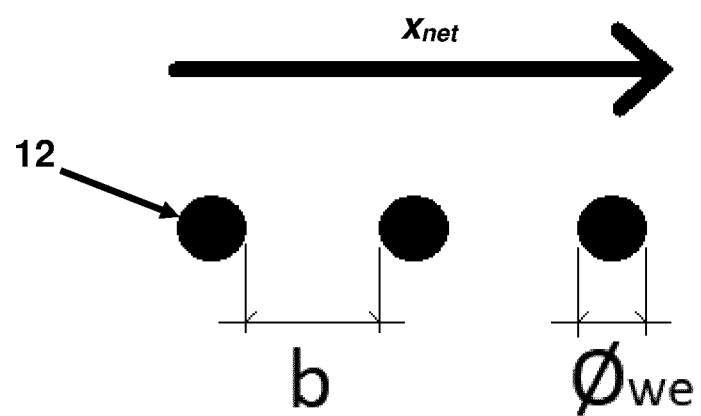
FIG. 4 shows the cross-sectional weft yarn area per net length in the warp direction ($x_{net}$) of the insect net 10.

The cross-sectional weft yarn area per net length in the warp yarn direction ($A'_{we}/x$) of the insect net is determined by the cross-sectional area ($A'_{we}$) of the weft yarn 12 used for weaving the insect net 10, and the number of weaving picks per meter in the warp yarn direction ($x_{net}$). Each weft yarn 12 has a cross sectional area $A'_{we}=\pi \cdot r^2$ measured in mm². The weaving picks indicates the number of weft yarns 12 inserted between the warp yarns 11 per meter in the warp yarn direction ($x_{net}$) and depends on the distance between two adjacent weft threads, i.e., the length (b) of a hole 13, as well as the diameter of the weft yarn ($\varnothing_{we}$), both measured in mm (see FIG. 4). Thus, the cross-sectional weft yarn area per net length ($A'_{we}/x$) of the insect net can be calculated as follows:

$$A'_{we}/x = \frac{\pi \times (\varnothing_{we}/2)^2}{(b+\varnothing_{we})} \quad \text{Formula II}$$

wherein
$A'_{we}/x$=the cross-sectional weft yarn area per net length in the warp yarn direction ($x_{net}$)
$\varnothing_{we}$=the diameter of the weft yarn
b=the length of the hole in the warp yarn direction ($x_{net}$)

Figure 11:
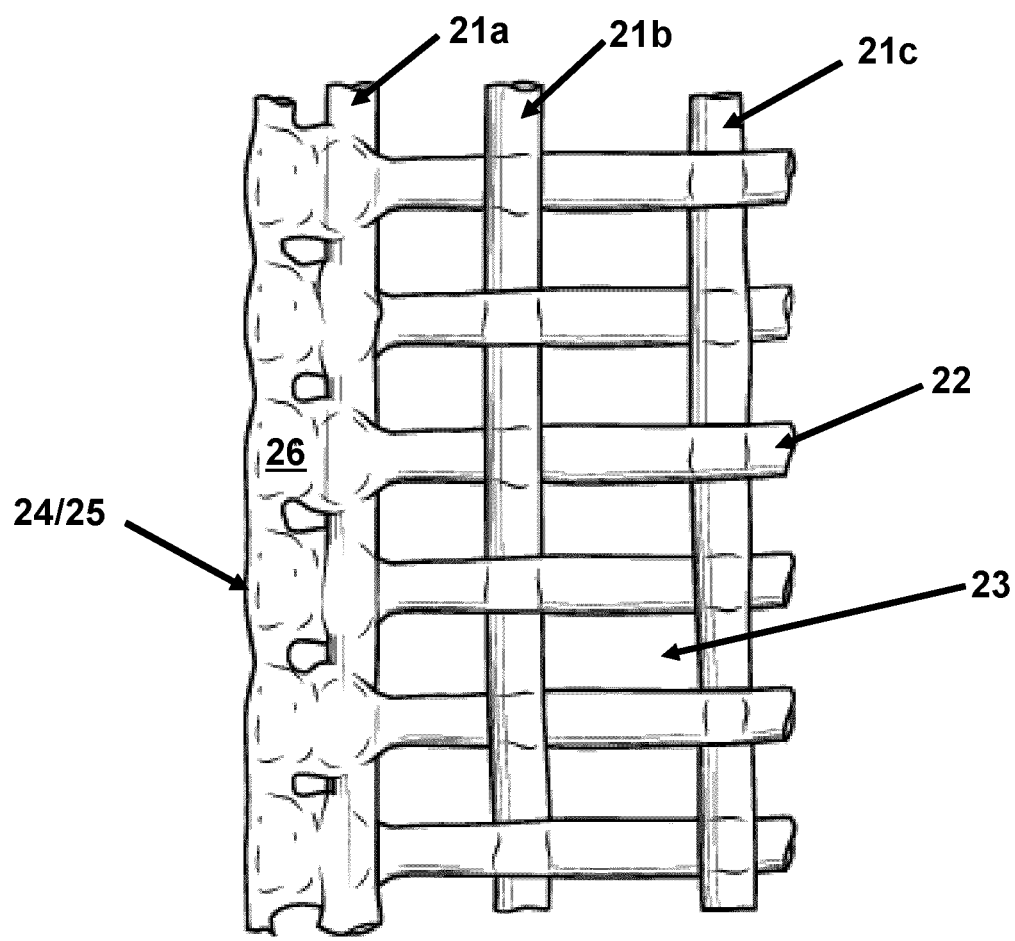
FIG. 11 shows a detailed view of an edge 24, 25 wherein the outer most warp yarn 22 is only barely included in the deformation zone 26.

A method of manufacturing an insect net strip 20 from the insect net 10 as disclosed above will now be described. The insect net strips 20 are advantageously used for confectioning accordion-type insect net assemblies 63 (see FIG. 15a), that may be used in openings to allow ventilation while at the same time prevent passage of insects therethrough. Advantageously the same accordion-type assemblies are further confectioned into accordion-style net constructions 60 for use in greenhouse roof ventilation openings as seen in FIG. 11.

A one-step ultrasonic cut and seal process is used to manufacture the insect net strip 20, wherein the method comprises the steps of
  a) providing a woven insect net 10 (see FIGS. 2a and 2b) comprising warp yarns 11 extending in a warp yarn direction ($x_{net}$) of the woven insect net 10, and weft yarns 12 having a weft yarn diameter ($ø_{we}$), and extending in a weft yarn direction ($y_{net}$) substantially perpendicular to the warp yarn direction ($x_{net}$) of the woven insect net 10, wherein at least 90% of the warp and weft yarns 11, 12 are monofilament yarns made of a thermoplastic material; and
  b) The woven insect net 10 is fed into an ultrasonic cutting device 40 (see large arrow in FIG. 5) comprising an ultrasonic surface 41 and at least two ultrasonic cutting and welding tools 42 (see detailed view of FIG. 5); and
  c) The woven insect net 10 is fed through the ultrasonic cutting device 40 (see FIG. 5) to obtain an insect net strip 20 (see FIG. 6a) having
    a width ($w_{strip}$) in the transverse direction ($y_{strip}$) of the strip 20, which is smaller than a width ($w_{net}$) of the woven insect net 10; and
    a first and a second edge 24, 25 extending in a longitudinal direction ($x_{strip}$) of the insect net strip 20 and parallel to the warp yarns 21 of the insect net strip 20, the first and second edges 24, 25 each comprising a deformation zone 26 being constituted by consolidated thermoplastic material deriving at least from weft yarns 22 of the insect net strip 20 (see FIG. 6b), the deformation zone 26 having a length along the edge 24, 25 and a width ($w_{dz}$) in the transverse direction ($y_{strip}$) of the insect net strip 20, the width ($w_{dz}$) of the deformation zone 26 being in the range of between 0.5 and 35 times the weft yarn diameter ($ø_{we}$); and wherein
    at least 90% of gaps 23 between adjacent weft yarns 22 in the deformation zone 26 are closed by at least the weft yarns being melted together, thereby forming a consolidated reinforced edge portion 24, 25 of the insect net strip 20.

Figure 5:
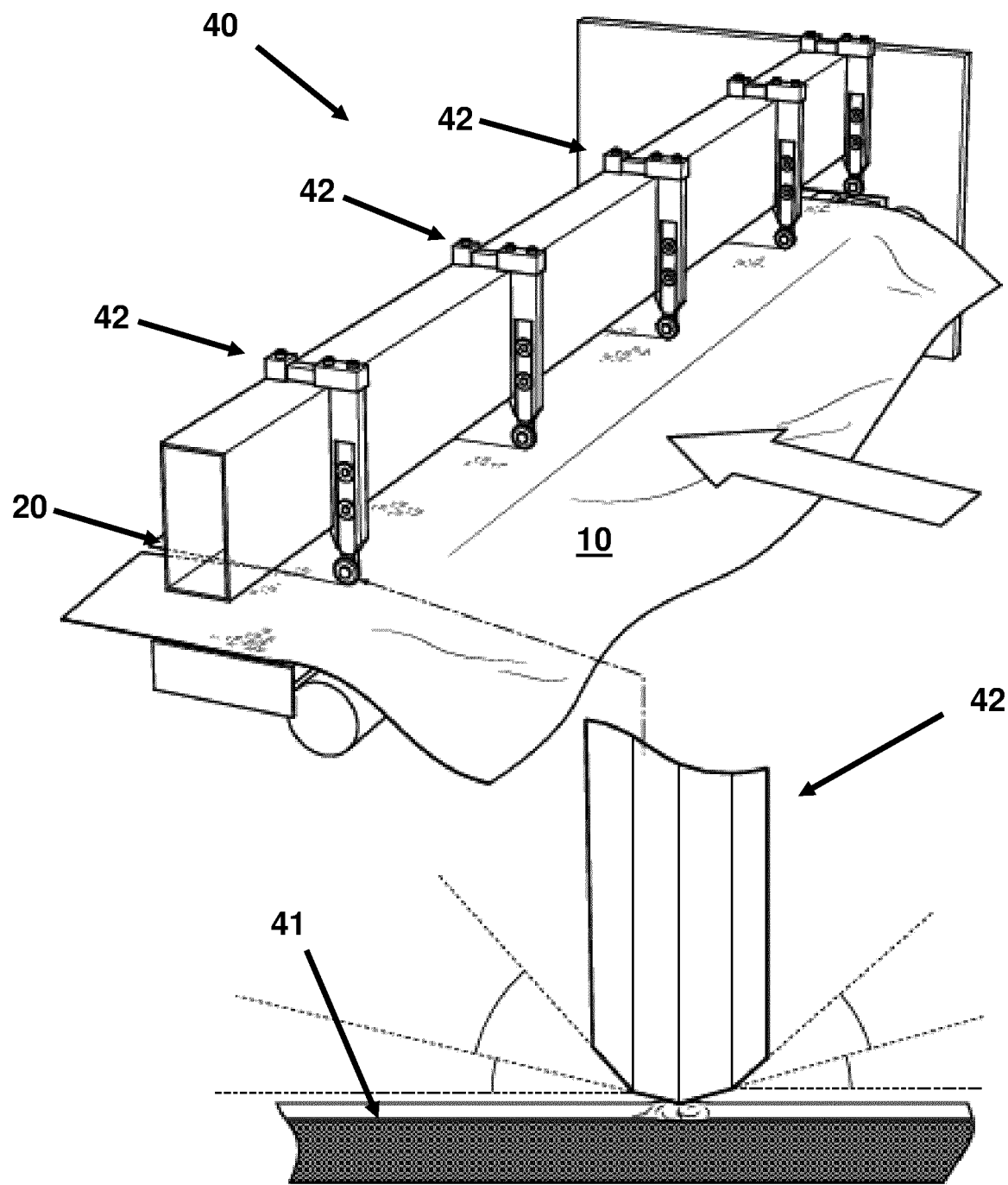
FIG. 5 shows a view of the ultrasonic cutting device 40 used for cutting the insect net 10 to obtain an insect net strip 20 of the invention (the insert shows a detailed view of the ultrasonic surface 41 with a cutting and welding tool 42.
Figure 6A:
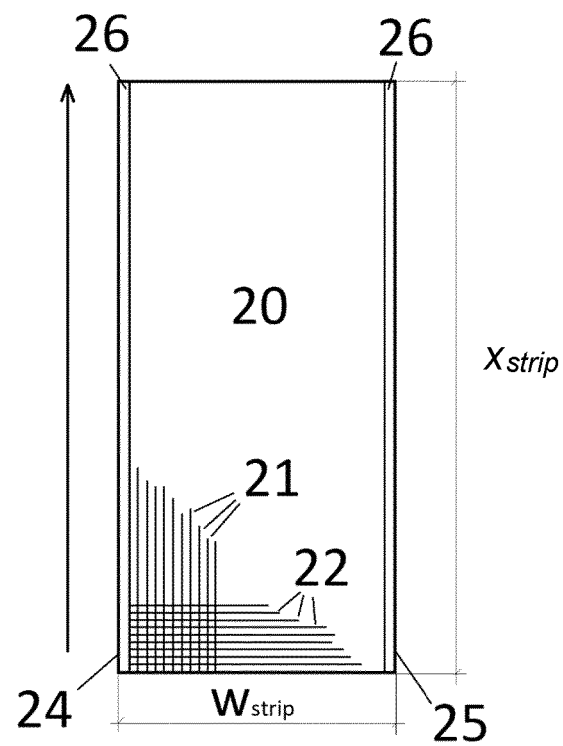
FIG. 6a is a view of an insect net strip 20 of the invention.

The ultrasound cutting and welding tools 42 are advantageously cutting wheels (see detail of FIG. 5). The cutting wheel used in the ultrasonic cutting and sealing process is selected in such a way that it both cuts the weave and seals the edge in one step. It is also optimized to leave a very narrow deformation zone 26, facilitating subsequent confectioning of the insect net strip 20.

Advantageously an ultrasonic device 40 wherein the cutting and welding tool 42 is a rotating blunt U-, V- or a mixed U/V-shaped cutting edge is used. The advantage of a rotating wheel is the slower blunting of the edge. The machine also runs smoother with less friction.

Figure 7A:
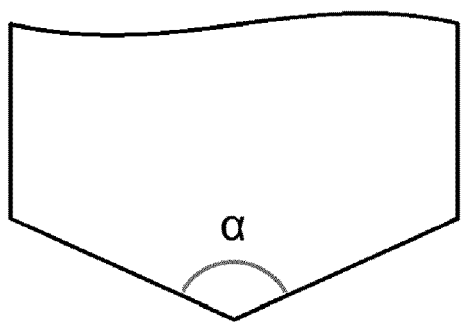
FIGS. 7a-7d are views of ultrasonic cutting and welding tools used to cut the insect net, wherein (a) the ultrasonic cutting and welding tool has a V-profile with one edge angle; in (b) the ultrasonic cutting and welding tool has a U-shape with an edge radius; in (c) the ultrasonic cutting and welding tool has a U/V-mix profile with an edge angle and an edge radius; and in (d) the ultrasonic cutting and welding tool has a V-profile with a first angle and a second angle.

When the ultrasonic cutting and welding tools has a V-profile it advantageously has an edge angle α of 80°-175°, preferably an edge angle α of 100°-175°, or more preferably an edge angle α of 120°-170° (see FIG. 7a).

Figure 7B:
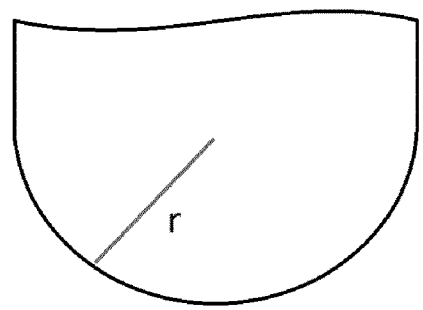

When the ultrasonic cutting and welding tools has a U-shape it advantageously has an edge radius r of 0.25-3.00 mm, preferably an edge radius r of 0.50-2.00 mm (see FIG. 7b).

Figure 7C:
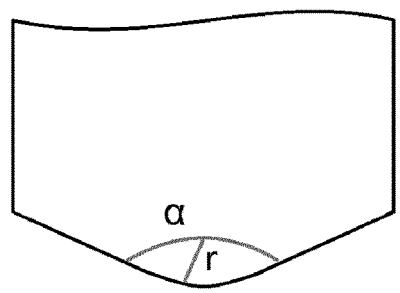

When the ultrasonic cutting and welding tools has a U/V-mix profile it advantageously has an edge angle α of 80°-175°, preferably an edge angle α of 100°-175°, or more preferably an edge angle α of 120°-170°, and an edge radius r of 0.25-3.00 mm, preferably an edge radius r of 0.50-2.00 mm (see FIG. 7c).

Figure 7D:
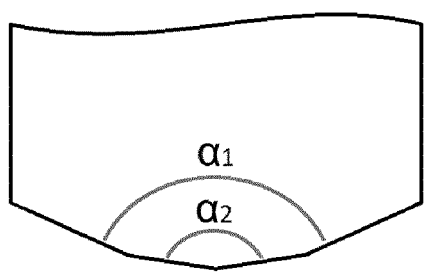

The ultrasonic cutting and welding tool may also have a V-profile with more than one angle, wherein the first angle $α_1$ is 80°-130° and the second angle $α_2$ is 120°-175° (see FIG. 7d).

The ultrasonic energy is applied through a sonotrode 41 (see detail of FIG. 5) opposing the cutting and welding tool 42. With high enough power applied on the blunt edge of the cutting and welding tool, the weft yarns will be melted together to form a mechanically sealed edge The ultrasonic surface (sonotrode) provides a frequency of 20-50 kHz and an electrical power of 300-500 W per cutting/welding tool. This power can be expressed as electrical power put into the ultrasonic controller in relation to the feeding speed of the cloth/net through the cutting machine. The woven insect net 10 is fed through the ultrasonic cutting device 40 at a speed of 6.5 m/min-12 m/min.

The ultrasonic cutting and sealing device must apply enough energy in relation to the speed feeding the insect net 10 through the ultrasonic cutting device 40 to be able to properly melt together the weft yarns resulting in a sealed edge. The cutting edge of the cutting and welding tool 42 must have an angle large enough to not just cut, but also to melt the adjacent material. Merely cutting can be performed with a sharper tool and is an easier task than the combined sealing/melting process described herein.

Figure 6B:
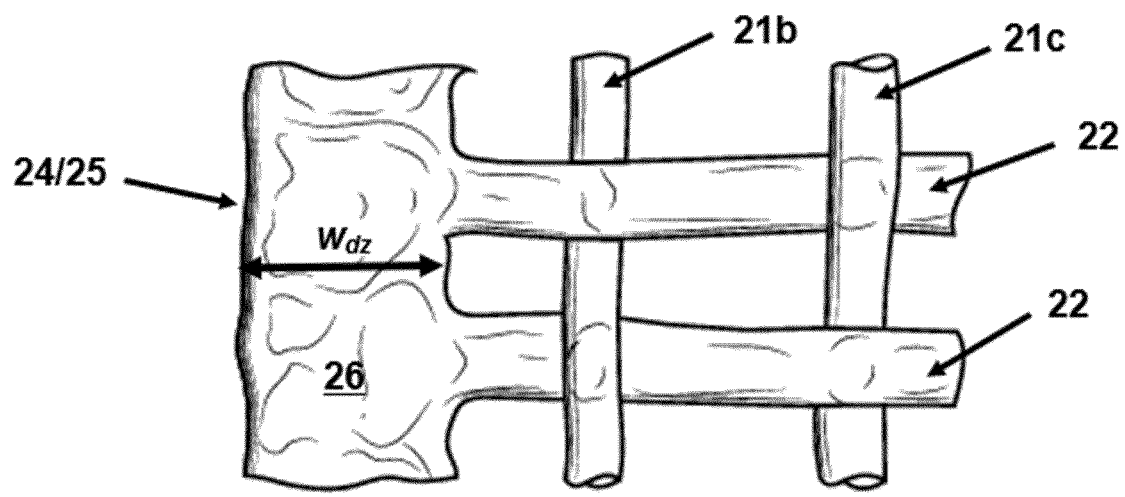
FIG. 6b is a view of an edge 24, 25 of an insect net strip 20 cut by the method described herein, wherein the outer ends of all weft yarns 22 are thoroughly melted together in a deformation zone 26.

The shape of the cutting tool 42 and the power applied will result in a deformed (melted) zone 26 some distance away from the edge as seen in FIG. 6b. This can be seen and measured under the microscope. The width ($w_{dz}$) of the deformed zone 26 is within a certain range if a suitable power, speed and tool shape has been used.

Figure 8A:
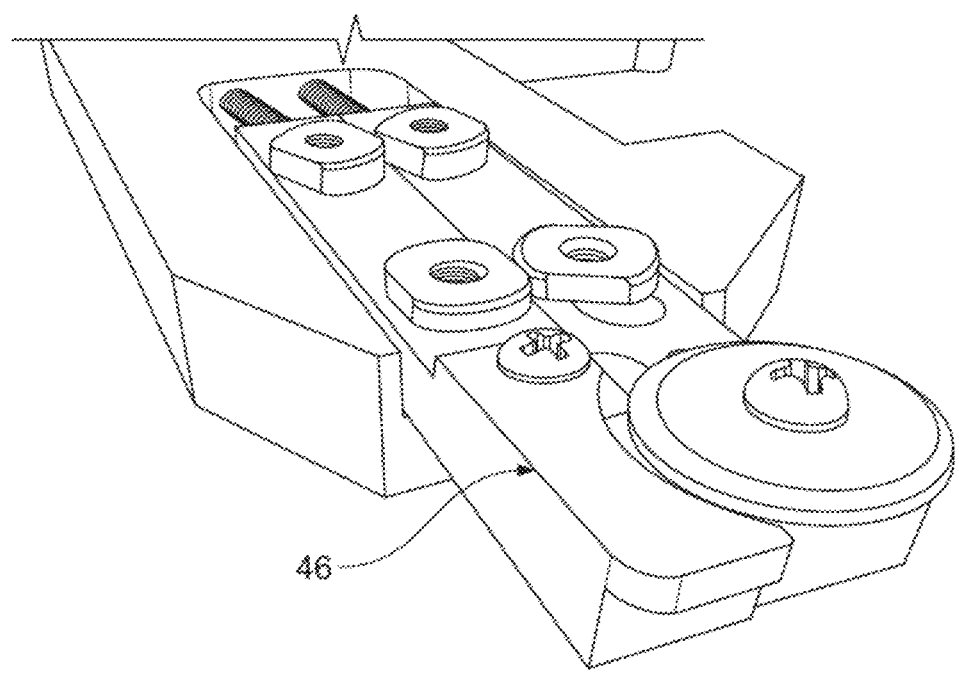
FIG. 8a is a view of the anvil block 46 which is placed in front of the cutting wheel.
Figure 8B:
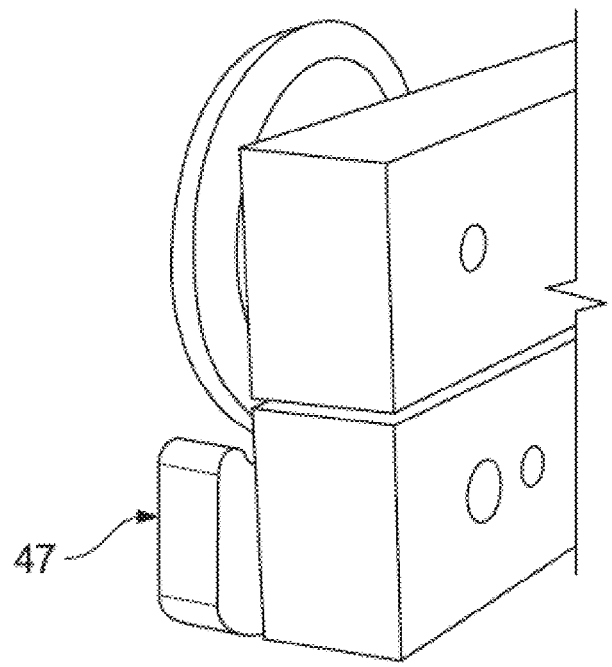
FIG. 8b is a view of the flat rectangular surface 47 of the anvil block 46.

In a further embodiment, the ultrasonic cutting and welding tool 42 may be provided with a flat anvil block 46 which is placed in front of the cutting wheel (see FIG. 8a). The flat anvil block 46 ensures that the insect net 10 intended to be cut is kept close to the sonotrode 41 i.e., the counterpart to the cutting and welding tool 42 through which the ultrasonic energy is applied. The anvil block 46 is advantageously provided with a flat rectangular surface 47 which is in contact with the insect net 10 being fed into the ultrasonic cutting device 40. The flat rectangular surface has an area of 1.0-3.0 mm×5.0-15 mm, preferably 1.5-2.5 mm×7.5-12.5 mm (see FIG. 8b, showing the flat rectangular surface 47 that abuts the insect net). The cutting wheel is of the same types as described above. Also, the ultrasonic effect, the frequency and speed are the same as used for the cutting and welding tool 42 without a flat anvil block 46.

Figure 9:
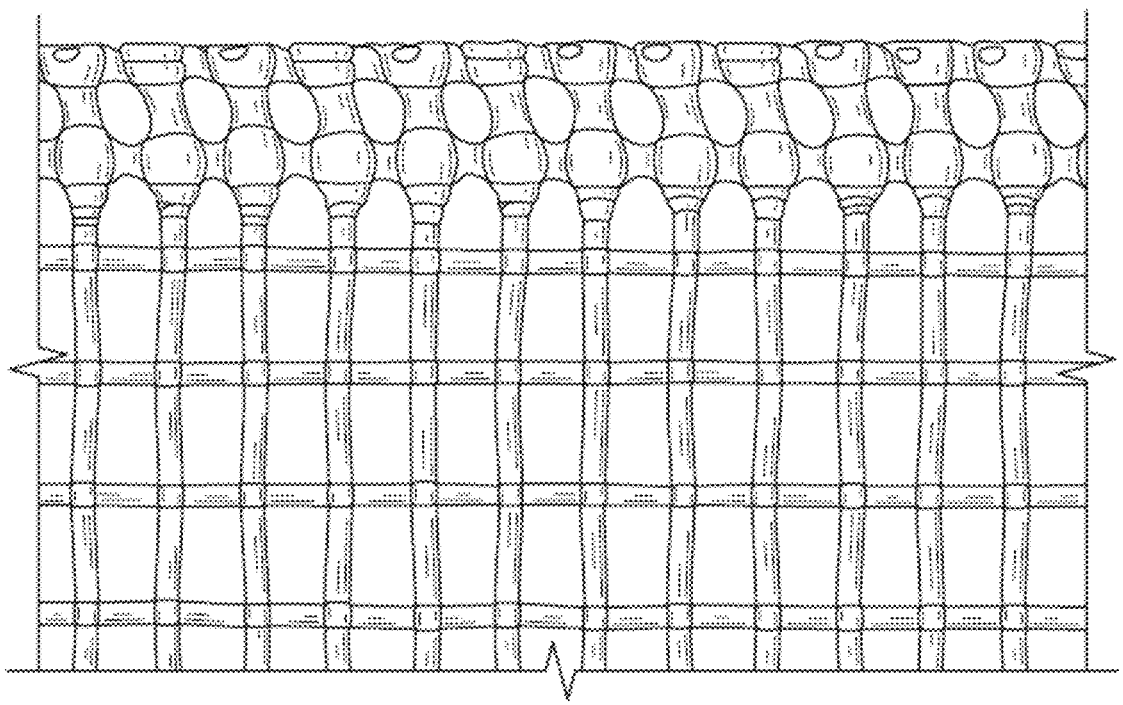
FIG. 9 is a view of the edge 24, 25 of an insect net strip 20 cut and sealed with the cutting and welding tool provided with a flat anvil block 46.

The flat anvil block 46 ensures that at least one warp yarn 22 is included in the deformation zone 26, resulting in reliable edges for the insect net strip 20 without risk of warp yarns 22 unraveling from the edges 24, 25. FIG. 9 is a view of the edge of an insect net strip produced by a cutting and welding tool 42 provided with a flat anvil block 46.

The resulting edges 24, 25 are suitable for further confectioning of insect net systems if the weft yarns are connected (melted together) in most cases. The edge is considered suitable if 90% or more of the gaps between adjacent weft yarns in the deformation zone 26 have a mechanical connection by weft yarns being melted together. The deformation zone 26 along the insect net strip is visible under a microscope and can be measured on the end product.

FIG. 6 shows an insect net strip 20 of the invention which has been produced by cutting an insect net 10 described above in a warp direction ($x_{net}$). As seen in FIG. 10a, the insect net strip comprises warp yarns 21 extending in a longitudinal direction ($x_{strip}$), i.e., in the warp direction of the insect net strip 20, and weft yarns 22 having a weft yarn diameter ($ø_{we}$), and extending in a transverse direction ($y_{strip}$), i.e., in the weft direction of the insect net strip 20. The weft yarns 22 extend perpendicular, or substantially perpendicular to the longitudinal direction ($x_{strip}$) and alternately go over and under the consecutive warp yarns 21. The warp yarns 21 and the weft yarns 22 are spaced apart from each other leaving air gaps or holes 23 in between having a length b in the warp direction ($x_{strip}$) and a width a in the weft direction ($y_{strip}$).

At least 90% of the warp and weft yarns 21, 22 of the insect net strip 20 are monofilament yarns, made of a thermoplastic material. The insect net strip 20 can be manufactured from monofilament yarns of any conventional thermoplastic fiber material but advantageously >80 wt. % of the thermoplastic monofilament yarn is a polyester or co-polyester conventional for fiber production, the wt. % is calculated based on the total weight of the yarn. Preferably the polyester is polyethylene terephthalate (PET), wherein at least 80 wt. % of the material originates from ethylene terephthalate monomers, with the remaining 20 wt. % being additives and/or other polymers. Such a material typically has a melting point of 240-260° C. and a density of 1.3-1.5 g/cm³.

The insect net strip 20 has a weaving pattern wherein at least 40%, preferably at least 60%, more preferably at least 80%, of the weft inserts 22 are single yarn inserts. As explained above for the insect net, weaving with single weft inserts provides the insect net strip with advantageous air-permeabilities.

Advantageously, the insect net strip 20 has a relative hole area ($A_h$) in a two-dimensional projection of 15-50%, but in order to better prevent insect passage, the relative hole area ($A_h$) for the insect net strip is advantageously 20-48%. The relative hole area ($A_h$) in a two-dimensional projection is defined by the ratio of the area of holes to the area of yarns in a given area of insect net strip and is calculated as shown for the insect net in Formula I above.

The insect net strip 20 disclosed herein has a hole size of 0.10-0.70 mm in a two-dimensional projection, i.e., in both the longitudinal and transverse direction of the insect net strip 20. Preferably the hole size in a two-dimensional projection of the insect net strip 20 is 0.10-0.60 mm, more preferably 0.10-0.50 mm, most preferably 0.15-0.40 mm.

Figure 10B:
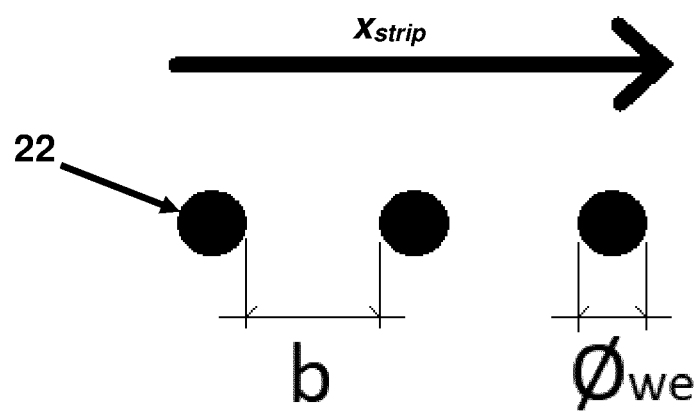
FIG. 10b shows the cross-sectional weft yarn area per net length in the warp direction ($x_{strip}$) of the insect net strip 20.

The insect net strip 20 disclosed herein has a cross-sectional weft yarn area per net length ($A'_{we}/x$) of 20-80 mm²/m in a longitudinal direction ($x_{strip}$). Advantageously, the cross-sectional weft yarn area per net length ($A'_{we}/x$) is 25-70 mm²/m in a longitudinal direction ($x_{strip}$). The cross-sectional weft yarn area per net length ($A'_{we}/x$) indicates the material area the weft yarns 22 add per unit length in the longitudinal direction (see FIG. 10b). It is determined by the weft yarn 22 diameter (øwe) and weaving picks per meter (m) and is calculated as given in Formula II as described for the insect net above.

The insect net strip 20 is obtained by cutting the insect net 10 described above in the warp direction ($x_{net}$) into strips 20 having a width ($w_{strip}$) in the transverse direction ($y_{strip}$) of 0.030-0.110 m, preferably a width of 0.050-0.090 m.

After cutting the insect net 10 using the method described herein, the obtained insect net strip 20 will have a first edge 24 and a second edge 25 extending in a longitudinal direction of the insect net strip 20 (i.e., in a warp direction ($x_{strip}$)) and parallel to the warp yarns 21. The first and second edges 24, 25 each comprise a deformation zone 26 being constituted by consolidated thermoplastic material deriving from at least the weft yarns 22 which have melted together to form a deformation zone 26.

The deformation zone 26 is defined as the average distance between the outer edge 24, 25 and the visual deformations that has affected the roundness of the outer-most tips of the weft yarns and can be measured under a calibrated microscope.

The deformation zone 26 will have a length along the first and second edge 24, 25, and a width ($w_{dz}$) in the transverse direction ($y_{strip}$), wherein the width ($w_{dz}$) of the deformation zone 26 is 0.5-35 times the weft yarn diameter ($ø_{we}$) as seen in FIG. 6b.

This means that with a weft yarn diameter of 0.15 mm, the width ($w_{dz}$) of the deformation zone 26 is between 0.075 mm to 5.25 mm, and with a weft yarn diameter of 0.23 mm, the deformation zone 26 is between 0.115 mm and 8.05 mm wide. Preferably the deformation zone 26 has a width ($w_{dz}$) which is 0.6-25 times the weft yarn diameter ($ø_{we}$), 0.7-20 times the weft yarn diameter ($ø_{we}$), or more preferably the deformation zone 26 has a width ($w_{dz}$) which is 0.8-15 times the weft yarn diameter ($ø_{we}$).

To form strong first and second edges 24, 25 which will enable good confectioning and prevent unraveling, at least 90% of gaps 23 between adjacent weft yarns 22 in the deformation zone 26 must be closed by consolidated thermoplastic material deriving from at least the weft yarns 22 which have melted together. This means that no more than one gap 23 out of ten gaps 23 between two adjacent weft yarns 22 in the deformation zone 26 is left unclosed along the cut edge 24, 25. Preferably at least 92%, such as at least 94%, such as at least 96% of the gaps 23 between adjacent weft yarns 22 are advantageously closed by consolidated thermoplastic material from the weft yarns 22 having been melted together in the deformation zone 26.

When used herein, the expression "closed by consolidated thermoplastic material" is intended to mean that adjacent weft yarns 22 together with preferably no more than two warp yarns 21a, 21b are melted together with each individual weft yarn 22 in the deformation zone 26 and form a continuous, or substantially continuous reinforced band-shaped edge portion 24, 25 of the insect net strip 20. Ideally, at most one warp yarn 21a is melted together with each individual weft yarn 22 in the deformation zone 26 to form a continuous, or substantially continuous reinforced band-shaped edge portion 24, 25 of the insect net strip 20.

Figure 12:
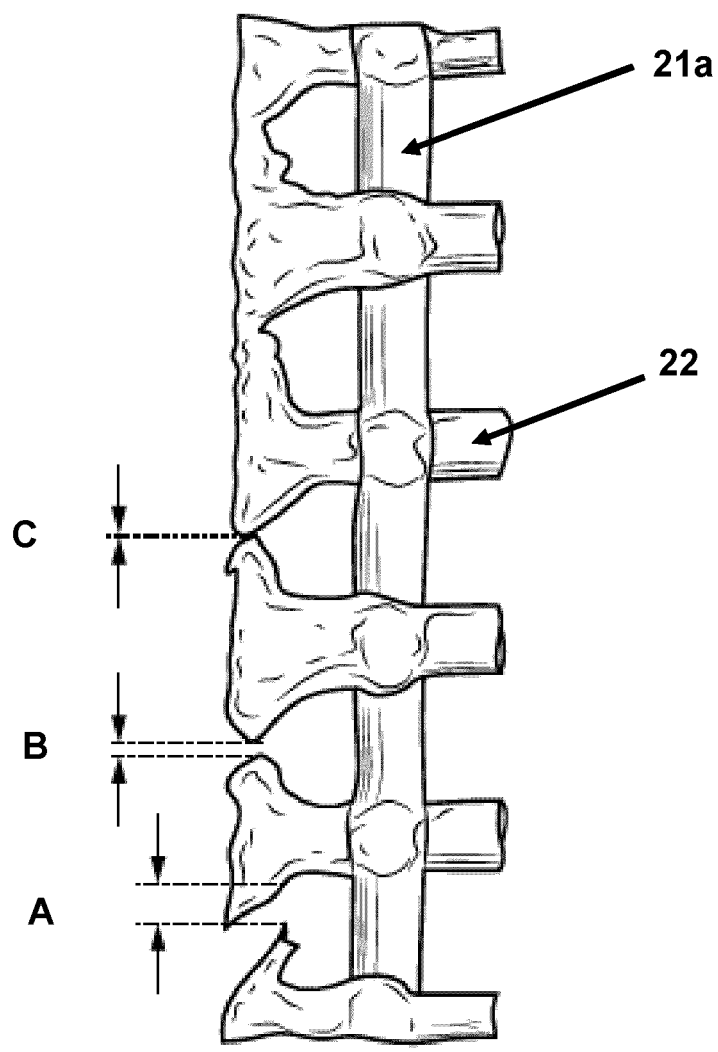
FIG. 12 is a view of a deformation zone 26 wherein some gaps (see A, B and C) between adjacent weft yarns 22 are not fully closed.

FIG. 6b is a view of an edge 24, 25 of an insect net strip 20 cut and sealed by the method described herein. It is seen that the outer ends of all weft yarns 22 are thoroughly melted together with the outer most warp yarn 21a along the edge 24, 25 to form a deformation zone 26 with consolidated thermoplastic material as described herein. Ideally only the outer most warp yarn 21a, i.e., the warp yarn closest to the cut edge 24, 25 is involved in the consolidation of thermoplastic material as seen in FIG. 6b. However, it is acceptable that also the warp yarn 21b second next to the cut edge 24, 25 is melted together with each individual weft yarn 22 to be included in the consolidation of thermoplastic material in the deformation zone 26. However, in order to provide a narrow edge 24, 25 it is preferable that no warp yarns are included in the consolidated thermoplastic material of the deformation zone (see FIG. 11). This is acceptable as long as at least 90% of gaps 23 between adjacent weft yarns 22 in the deformation zone 26 are closed. FIG. 12 is a view of a deformation zone 26 wherein some gaps 23 (see A, B and C) between adjacent weft yarns 22 are not fully closed.

As described above, the width ($w_{dz}$) of the deformation zone depends on weft yarn thickness. A thinner yarn may give a narrower deformation zone but can still result in a well-sealed edge if the weft material area per net length ($A'_{we}/x$) is high enough. Wider deformation zones require more power to produce, and consequently there is a practical/economical upper limit of how wide the deformation zone should be.

There is also a disadvantage with a deformation zone which is too wide or solid since it will be harder for a needle to penetrate when confectioning. Very wide deformation zones also tend to smear the melted plastic, resulting in an uneven edge, which also is negative in confectioning.

There are several advantages in manufacturing the insect net strips 20 using the method disclosed herein as compared to conventional band weaving to produce the lamellas. The most important advantage being the possibility to use many different weaving patterns and the avoidance of any double weft inserts. With conventional band weaving double weft inserts are often used which will diminish air permeability of the insect net. With wide weaving, the weave can be optimized for insect control and high air flow, resulting in an improved possibility to cool and dehumidify the greenhouse.

Careful selection of weft yarns and the number of picks per centimeter will give the insect net strip 10 a high stiffness in the weft direction, making the finished accordion construction robust and more self-supporting, thereby reducing the need of other mechanical support to hold the construction in place in the greenhouse. The shape of the holes in the net may be turned such that they have their longest extension in the weft direction. In this way more material is available for the one-step ultrasonic cut and seal process which will also improve the stiffness in the weft direction, making a subsequent accordion construction stiffer, thereby further reducing the need for extra support in the final product.

Since the selection of warp yarns is of less importance in the present process, it is instead possible to use the warp yarns to optimize the net for insect control and high air flow.

Another advantage is that narrow edges are produced on each side of the insect net strip by the method disclosed herein. Conventional band weaving produces lamellas with bulky selvage edges. This can be seen in FIG. 13a which is a view of a longitudinally extending edge on a band woven net. Since the double inserted weft yarns each make a loop around the outer most warp yarn, a large amount of material is added in this area. This should be compared to the edges formed using the method disclosed herein (see e.g., FIGS. 13b and 13c).

The ultrasonic cutting and sealing technique used in the present method provides an insect net strip with a smooth edge having a deformation zone with a limited width. Weft yarns and the number of picks per centimeter can be selected to give a cross-sectional weft yarn area per net length which is high enough for the edges along the insect net strip to be sealed without including any warp yarn, or at the most one warp yarn. However, one, or at most two warp threads may be included in the deformation zone with consolidated weft and warp yarns. As long as at least 90% of the gaps between adjacent weft yarns are closed, the edges are suitable for confectioning.

The narrow deformation zones are advantageous since wide areas with melted plastic are more difficult for the needle on the sewing machine to penetrate. When lamellas are sewn together to an accordion-type assembly later in the process, the total thickness of the construction becomes substantially lower (>25%) using insect net strips produced with the method disclosed herein. In a greenhouse, everything that is smaller in the ceiling means less shading and more light reaching the plants.

Weaving wider nets and thereafter cutting them into narrow strips using the one-step cutting and sealing method described herein provides a great advantage for the end product.

Figure 1:
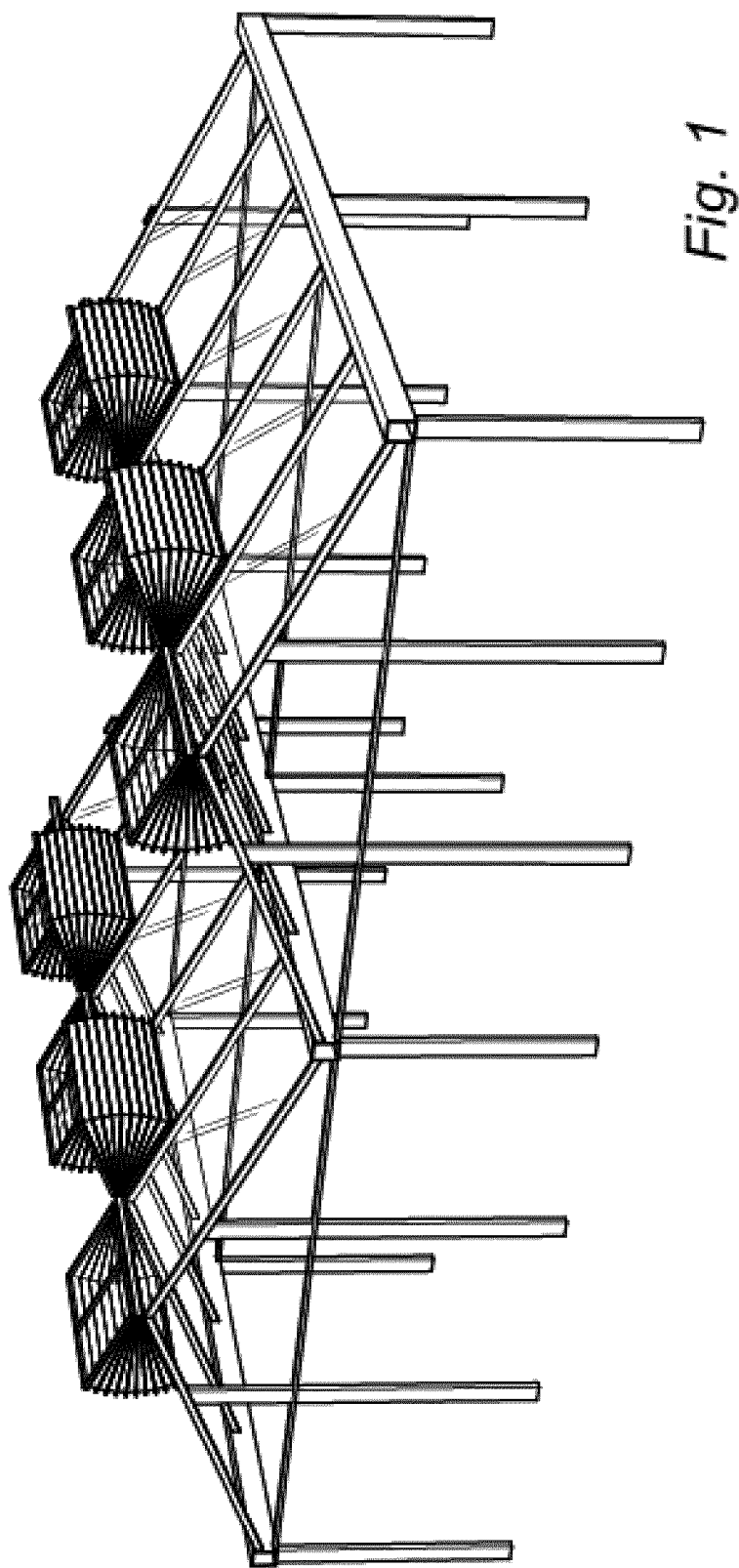
FIG. 1 is a view of an accordion type of insect net construction when installed in a ventilation opening of a greenhouse.
Figure 14:
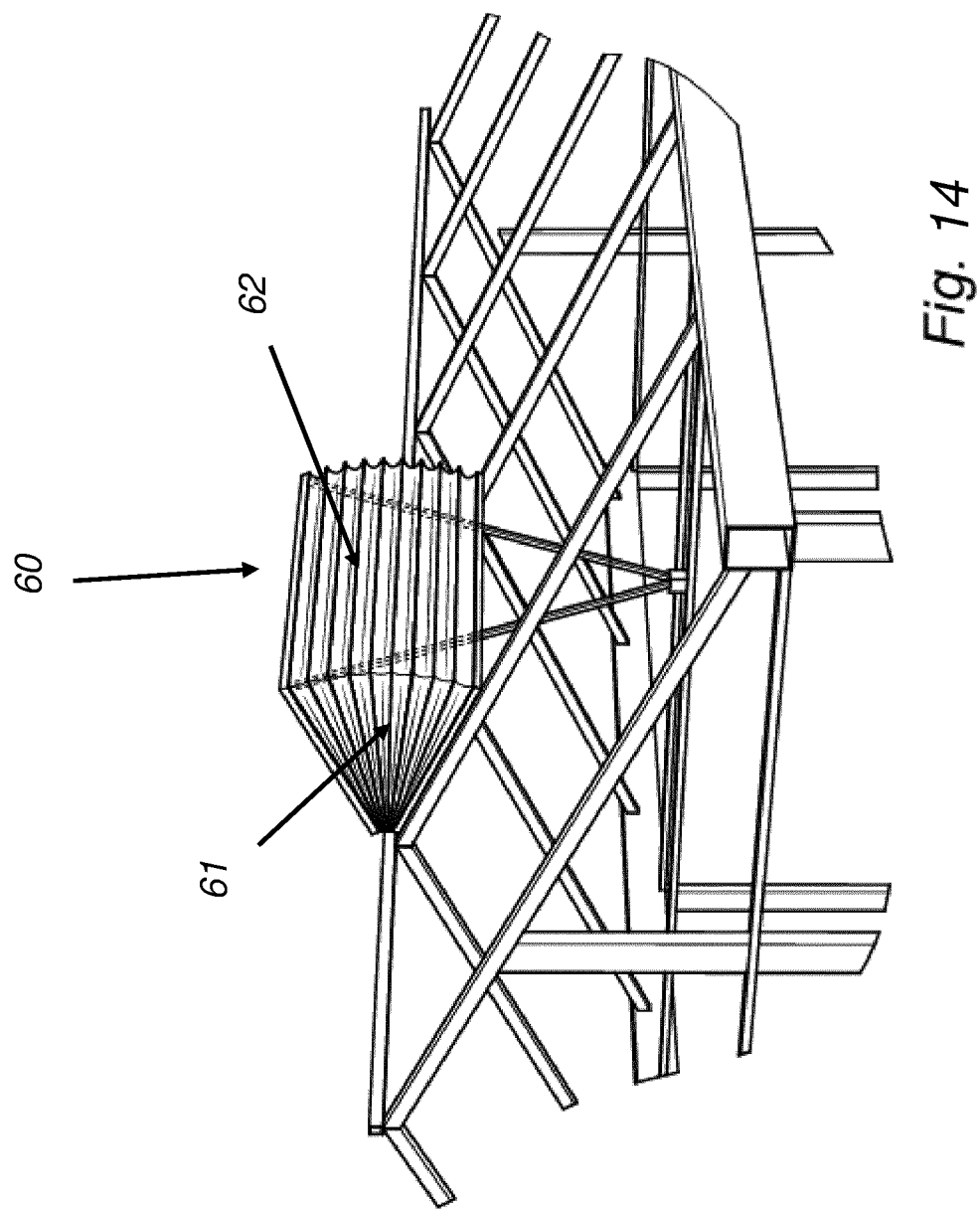
FIG. 14 is a view of an accordion-style insect net construction 60 confectioned from insect net strips 20 of the invention herein and arranged in a ventilation opening of a greenhouse.
Figure 15A:
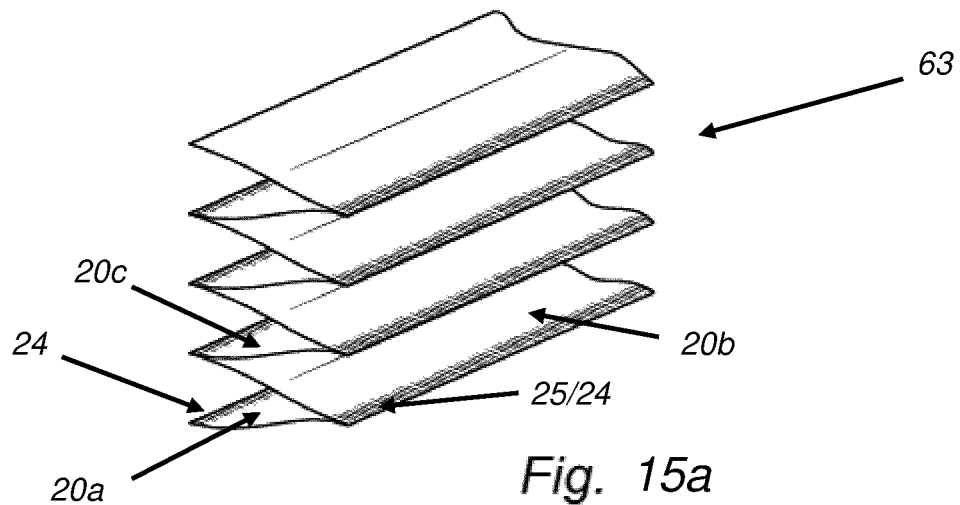
FIGS. 15a-c are views of how the insect net strips 20 are confectioned into accordion-type assemblies 63 and parts used to manufacture accordion-style insect net constructions 60.

The insect net strips 20 produced by the disclosed method are advantageously used for producing accordion-type insect net assemblies 63 (see FIG. 15a). Such accordion-type assemblies 63 can be used in ventilation openings to increase the total area of ventilation through an opening compared to a flat net covering the same opening. The accordion-type assemblies 63 may advantageously be used for manufacturing accordion-style ventilation screens 60 as can be seen in FIGS. 1 and 14. Such accordion-style ventilation screens 60 are typically made from two accordion-type assembly side screens 61 connected to an accordion-type assembly middle screen 62.

During production of an insect net accordion-style assembly 63, two insect net strips 20a, 20b are put flat on top of each other and sewn together along one edge 24, 25 at the most 10 mm from the outer edge 24, 25. An additional insect net strip 20c is put on top of the first two and sewn together with the upper most insect net strip 20b along the opposite longitudinal edge 24, 25 in the same way. This can be repeated with the desired number of insect net strips 20 to form an accordion-style assembly 63 as seen in FIG. 15a.

Since the insect net strips 20 are made from a material which is stiff enough, no undesired creases or folds will form and when the accordion-style assemblies 63 are folded shut, the individual insect net strips 20 will lie flat against each other.

Figure 15B:
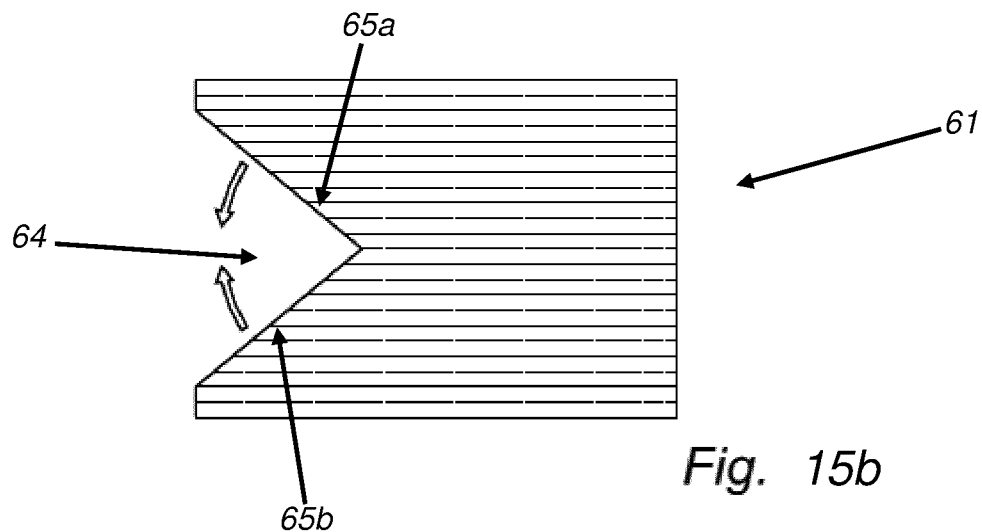
Figure 15C:
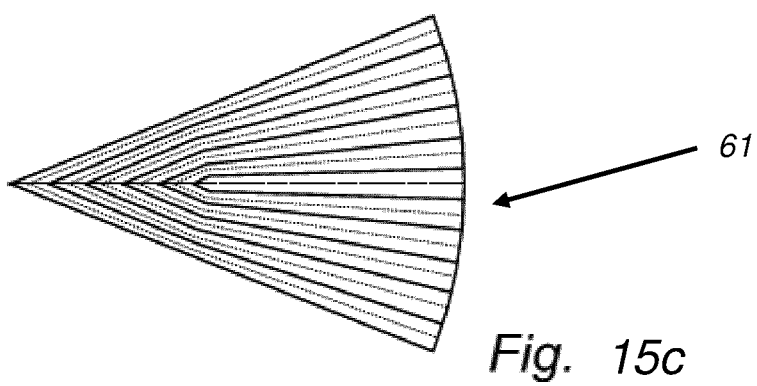

For the side screens 61, a triangular recess 64 is cut from the accordion-style assembly 63 as can be seen in FIG. 15b. The longitudinal edges 65a, 65b along the recess 64 are connected as shown by the arrows, thereby forming a side-screen part 61 as shown in FIG. 15c that can be coupled to the middle screen 62 to form the accordion-type screen 60 as seen in FIG. 14.

The accordion-type screen construction 60 can be used in all greenhouse ventilation openings to stop unwanted insects entering the greenhouse. The accordion style confectioning gives a larger total net area than a flat net, with typically 20-40% higher air flow through the ventilation opening. It is also a flexible construction and easily fixed in a greenhouse ventilation window that can be opened and closed. An example of an accordion style construction is described in NL1007720(C2).

EXAMPLES

The following examples disclose net insect strips having been cut using the one-step cutting and sealing method described herein.

Example 1

Figure 16D:
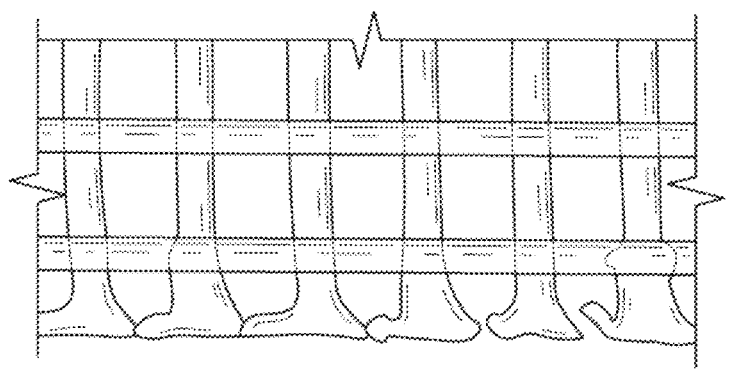
FIGS. 16a-d are views of edges cut using the method described in Example 1.
Figure 16C:
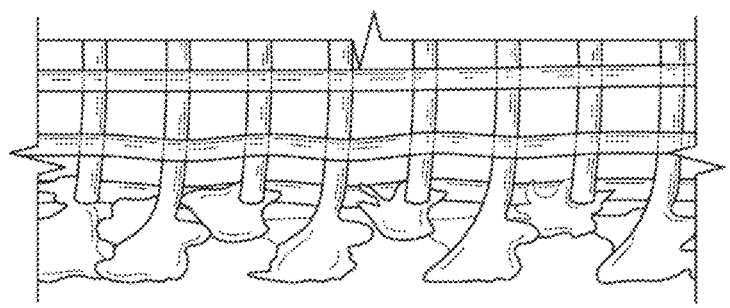
Figure 16B:
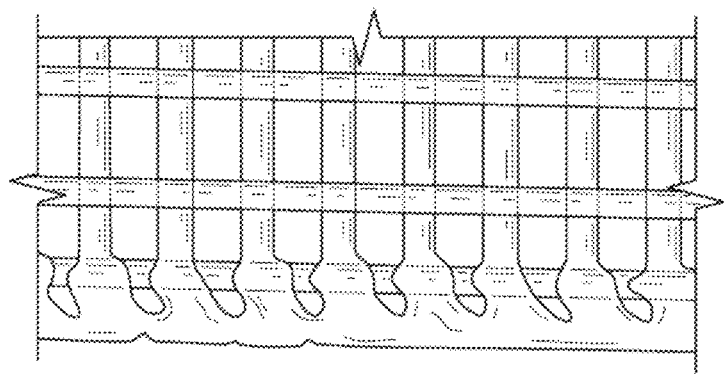
Figure 16A:
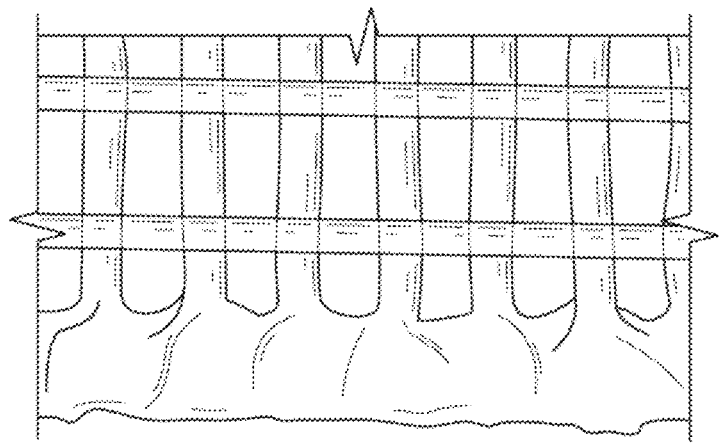

FIGS. 16a-d are views of edges cut using the method described herein. FIG. 16a shows an ideal edge formed in an insect net strip having a cross-sectional weft yarn area per net length of 67 mm$^2$/m. Here it is seen that the outermost warp yarn is included in the deformation zone and that the outer ends of all weft yarns, together with the outermost warp yarn has formed a solid consolidation of thermoplastic material. FIG. 16b is a view of an insect net strip having a cross-sectional weft yarn area per net length of 25 mm$^2$/m. Although the outermost warp yarn is not completely included in the consolidation of thermoplastic material, the formed edge is still acceptable since gaps between adjacent weft threads are closed. FIGS. 16c and 16d show insect net strips having a cross-sectional weft yarn area per net length of 18 mm²/m (16c), and 20 mm²/m (16d) respectively. Here it can be seen that these insect net strips do not have a cross-sectional weft yarn area per net length to obtain an edge with an acceptable deformation zone. The weft yarns cannot melt together to form a consolidation of thermoplastic material thick enough to be able to close gaps between adjacent weft yarns.

Example 2

Figure 17A:
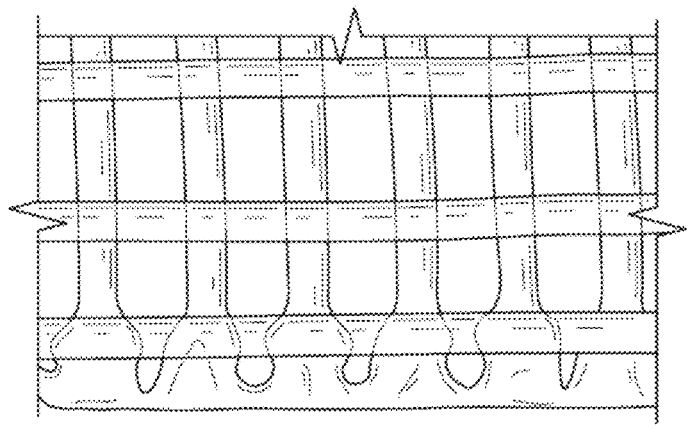
FIGS. 17a-d are views of edges cut using the method described in Example 2.
Figure 17B:
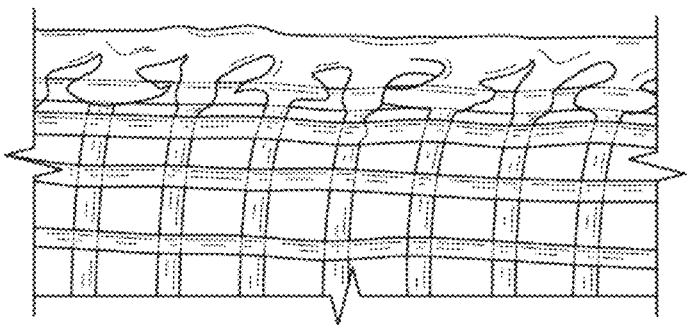
Figure 17C:
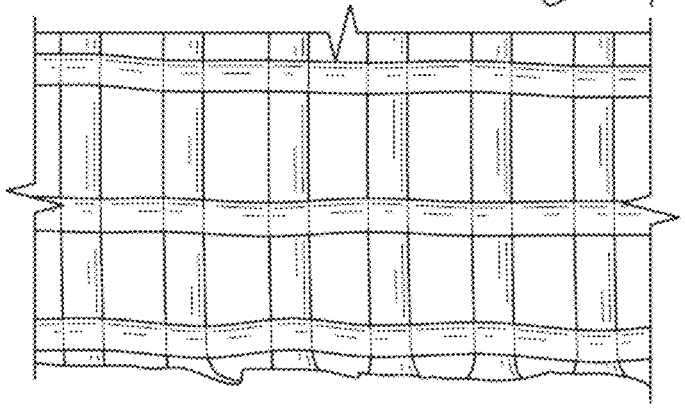
Figure 17D:
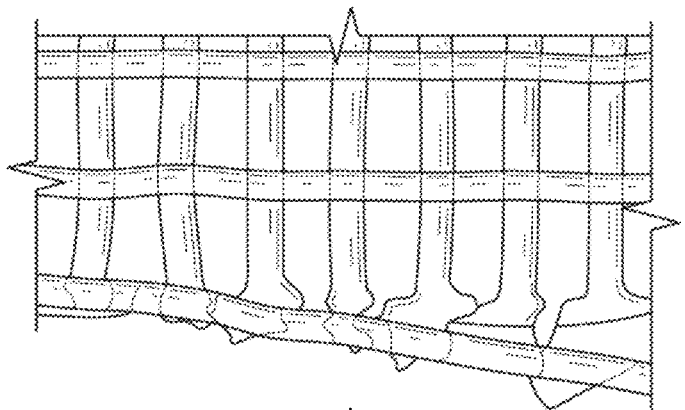

FIGS. 17a-d disclose insect net strips having a yarn thickness of 0.23 mm and a weft material area per net length of 67 mm²/m which were cut using a frequency of 25 kHz, a power of 500 W, and at a cutting speed of 9 m/min by means of different cutting tools. FIG. 17a shows a deformation zone formed using a V-shaped cutting tool with an edge angle α of 120°. As can be seen in the figure, the deformation zone is acceptable. Although no warp yarn is included in the consolidated thermoplastic material, the gaps between adjacent weft yarns are closed. FIG. 17b shows the same net having been cut using a hybrid V/U-shaped head with an edge angle α of 170° and a radius r of 1.5 mm in the center and 120° outside that. This limits the size of the deformation zone but still leaves a good welding with an even edge. FIG. 17c discloses the net being cut using a V-shaped tool having an edge angle of 90°. This cutting tool is too sharp for this type of net since the warp yarn can easily be pulled out. In FIG. 17d, a V-shaped tool having an edge angle of 60° was used. This tool is much too sharp since the outer most warp yarn is not held in place.

Example 3

Figure 18D:
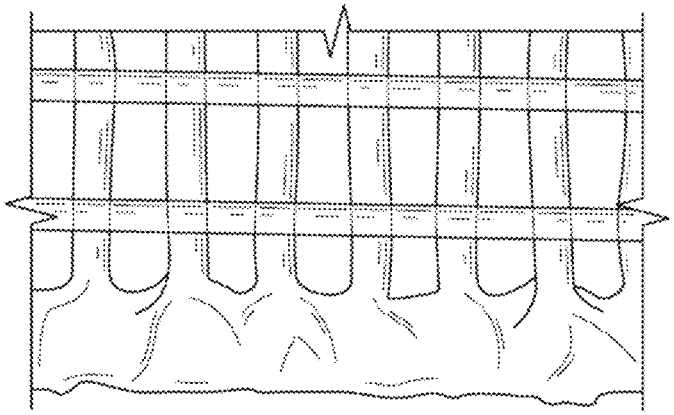
FIGS. 18a-d are views of edges cut using the method described in Example 3.
Figure 18C:
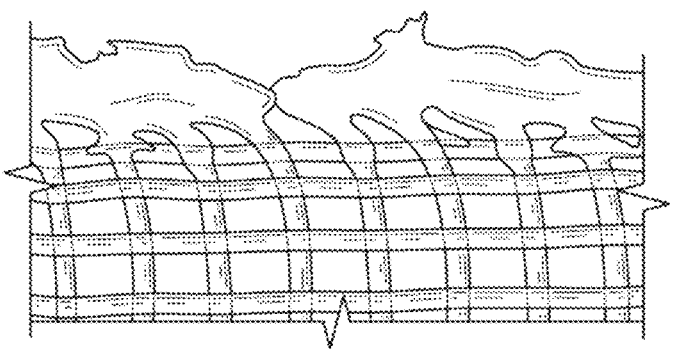
Figure 18B:
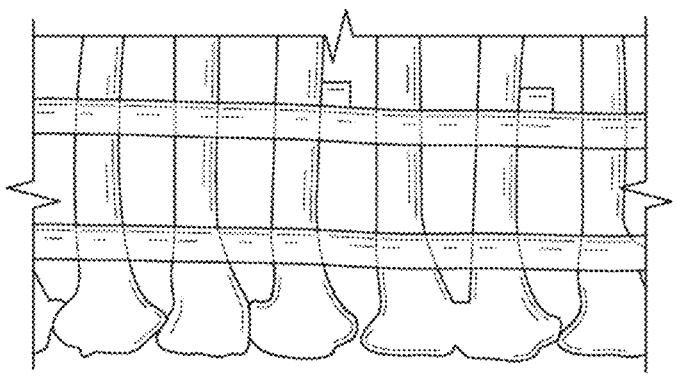
Figure 18A:
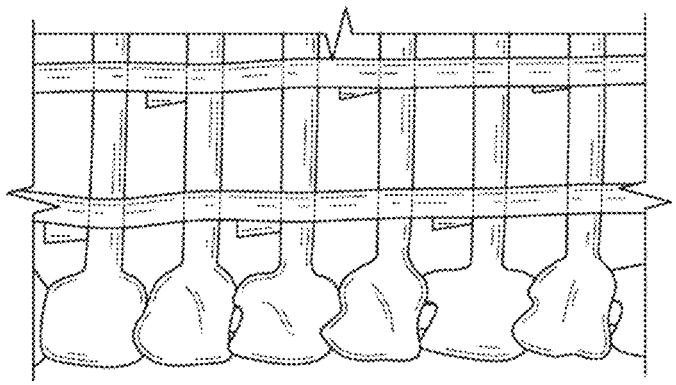

FIGS. 18a-d disclose insect net strips having a yarn thickness of 0.23 mm and a weft material area per net length of 0.67 mm²/m, which were cut by means of different cutting tools and using different machine settings. FIG. 18a discloses an insect net strip having been cut using a V-shaped cutting tool with an edge angle α of 120° at a speed of 12 m/min (500 W). As seen the deformation zone is ideal with the outer most warp yarn included in the consolidated thermoplastic material. The edge is even and narrow, while still being strong.

FIG. 18b discloses an edge of an insect net strip cut using a V-shaped cutting tool having an edge angle α of 120° at a speed of 25 m/min (400 W). Here it is seen that the cutting speed was too high leaving an uneven edge which will be difficult to process during later confectioning steps.

FIG. 18c shows an insect net strip that was cut with a V-shaped tool with an edge angle α of 120° at a speed of 20 m/min (400 W). The cutting speed was too high since the yarns have not melted enough to form a deformation zone with a consolidated thermoplastic material wherein the gaps between adjacent weft yarns are closed.

The same applies to the insect net strip shown in FIG. 18d which was cut using a V-shaped cutting tool having an edge angle α of 170° at a speed of 15 m/min (500 W). The weft yarns have not melted enough to form a solid deformation zone due to the high speed.

The invention claimed is:

1. A method of manufacturing an insect net strip comprising the steps of:
   a) providing a woven insect net comprising
      warp yarns extending in a warp yarn direction of said woven insect net, and weft yarns having a weft yarn diameter, and extending in a weft yarn direction of said woven insect net perpendicular to, or substantially perpendicular to said warp yarn direction of said woven insect net; and wherein
      at least 90% of said warp and weft yarns are monofilament yarns made of a thermoplastic material; and
   b) feeding said woven insect net into an ultrasonic cutting device comprising an ultrasonic surface and at least two ultrasonic cutting and welding tools; and
   c) feeding said woven insect net through said ultrasonic cutting device; to obtain an insect net strip having
      a width in a transverse direction, which is smaller than a width of said woven insect net; and
      a first and a second edge extending in a longitudinal direction of the insect net strip and parallel to warp yarns of said insect net strip, wherein said first and second edges each comprising a deformation zone being constituted by consolidated thermoplastic material deriving at least from weft yarns of said insect net strip, said deformation zone having a length along the edge and a width in the transverse direction of the insect net strip, the width of said deformation zone being in the range of between 0.5 and 35 times the weft yarn diameter; and wherein
      at least 90% of gaps between adjacent weft yarns in the deformation zone are closed by at least said weft yarns being melted together in said deformation zone, thereby forming a consolidated reinforced edge portion of said insect net strip.

2. The method according to claim 1, wherein in steps b) and c) said ultrasound cutting and welding tools are cutting wheels.

3. The method according to claim 2, wherein said ultrasonic cutting and welding tool has a V-profile with an edge angle (α) of 80°-175°, a U-shape with an edge radius (r) of 0.25-3.00 mm, a U/V-mix profile with an edge angle of 80°-175°, an edge radius of 0.25-3.00 mm, and/or a V-profile with a first angle of 80°-130° and a second angle of 120°-175°.

4. The method according to claim 1, wherein in steps b) and c) said ultrasonic cutting and welding tool is provided with a flat anvil block.

5. The method according to claim 1, wherein in steps b) and c) said ultrasonic surface (sonotrode) provides a frequency of 20-50 kHz and an electrical power of 300-500 W per cutting/welding tool, and said woven insect net is fed through the ultrasonic cutting device at a speed of 6.5 m/min-12 m/min.

6. An insect net strip comprising:
   warp yarns extending in a longitudinal direction of said insect net strip, and weft yarns having a weft yarn diameter, and extending in a transverse direction of said insect net strip perpendicular or substantially perpendicular to said longitudinal direction,
   wherein
      at least 90% of said warp yarns and said weft yarns of said insect net strip are monofilament yarns, made of a thermoplastic material; and in that said insect net strip has:
      a first and a second edge extending in a longitudinal direction of the insect net strip and parallel to said warp yarns, said first and second edges each comprising a deformation zone being constituted by consolidated thermoplastic material deriving from at least said weft yarns, said deformation zone having a length along the first and second edge, and a width in the transverse direction of the insect net strip, wherein the width of the deformation zone being in the range of between 0.5 and 35 times the weft yarn diameter; and at least 90% of gaps between adjacent weft yarns in the deformation zone being closed by consolidated thermoplastic material from at least said weft yarns which has been melted together and forming a continuous or substantially continuous reinforced band-shaped edge portion of said insect net strip.

7. The insect net strip according to claim 6, wherein >80 wt. % of the thermoplastic monofilament yarn is polyester or co-polyester (calculated based on the total weight of the yarn in the insect net strip).

8. The insect net strip according to claim 7, wherein the polyester is polyethylene terephthalate (PET).

9. The insect net strip according to claim 6, wherein said insect net strip has a weaving pattern wherein at least 40% of weft inserts are single yarn inserts.

10. The insect net strip according to claim 6, wherein the relative hole area in a two-dimensional projection is 15-50%.

11. The insect net strip according to claim 6, wherein the hole size in a two-dimensional projection and in a warp and weft direction is 0.10-0.70 mm.

12. The insect net strip according to claim 6, wherein the cross-sectional weft yarn area per net length is 20-80 mm$^2$/m in a longitudinal direction of the insect net strip.

13. The insect net strip according to claim 6, wherein said insect net strip has a width in the transverse direction of 0.030-0.110 m.

14. The insect net strip according to claim 6, wherein the deformation zone has a width in the transverse direction of the insect net strip which is 0.6-25 times the weft yarn diameter.

15. The insect net strip according to claim 6, wherein at least 92% of the gaps between adjacent weft yarns in the deformation zone are closed by consolidated thermoplastic material from said weft yarns.

16. The insect net strip according to claim 6, wherein no more than two warp yarns are melted together with each individual weft yarn and included in said deformation zone to form a continuous or substantially continuous reinforced band-shaped edge portion of said insect net strip.

17. The insect net strip according to claim 6, wherein at most one warp yarn is melted together with each individual weft yarn and included in said deformation zone to form a continuous or substantially continuous reinforced band-shaped edge portion of said insect net strip.

18. An accordion-style insect net construction comprising one or more accordion-type assemblies wherein which two or more insect net strips comprising:

warp yarns extending in a longitudinal direction of said insect net strip, and weft yarns having a weft yarn diameter, and extending in a transverse direction of said insect net strip perpendicular or substantially perpendicular to said longitudinal direction, wherein at least 90% of said warp yarns and said weft yarns of said insect net strip are monofilament yarns, made of a thermoplastic material; and in that said insect net strip has:

a first and a second edge extending in a longitudinal direction of the insect net strip and parallel to said warp yarns, said first and second edges each comprising a deformation zone being constituted by consolidated thermoplastic material deriving from at least said weft yarns, said deformation zone having a length along the first and second edge, and a width in the transverse direction of the insect net strip, wherein the width of the deformation zone being in the range of between 0.5 and 35 times the weft yarn diameter; and at least 90% of gaps between adjacent weft yarns in the deformation zone being closed by consolidated thermoplastic material from at least said weft yarns which has been melted together and forming a continuous or substantially continuous reinforced band-shaped edge portion of said insect net strip are sewn together.

19. An accordion-style insect net construction according to claim 18, wherein the accordion-style assembly comprises 8-36 insect net strips sewn together.

* * * * *